Sept. 21, 1965  G. D'ESPINASSY DE VENEL  3,207,254
FLUID POWER SYSTEM
Filed March 23, 1961  10 Sheets-Sheet 4

INVENTOR
Georges d'Espinassy de Venel
BY
Stevens, Davis, Miller + Mosher
ATTORNEYS Sept. 21, 1965   G. D'ESPINASSY DE VENEL   3,207,254
FLUID POWER SYSTEM Filed March 23, 1961   10 Sheets-Sheet 5

INVENTOR
Georges d'Espinassy de Venel
BY
Stevens, Davis, Miller + Mosher
ATTORNEYS

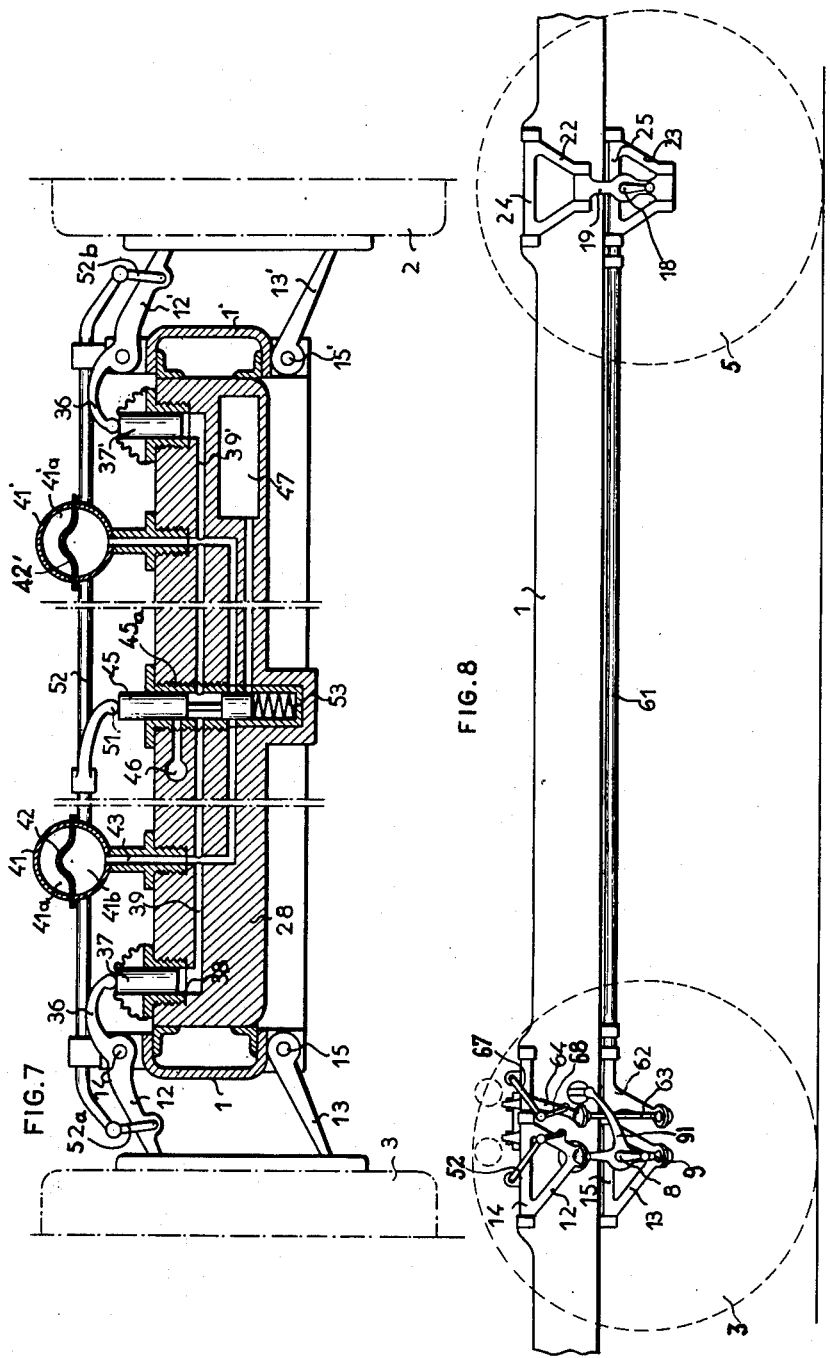

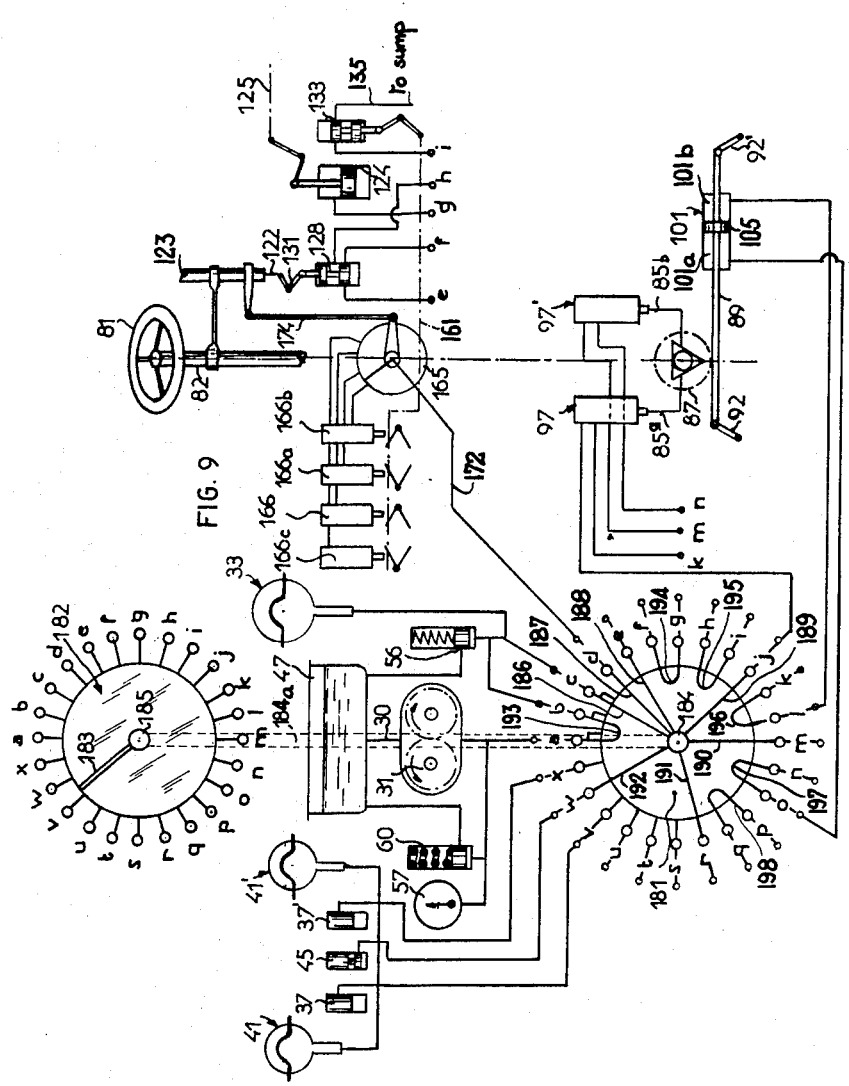

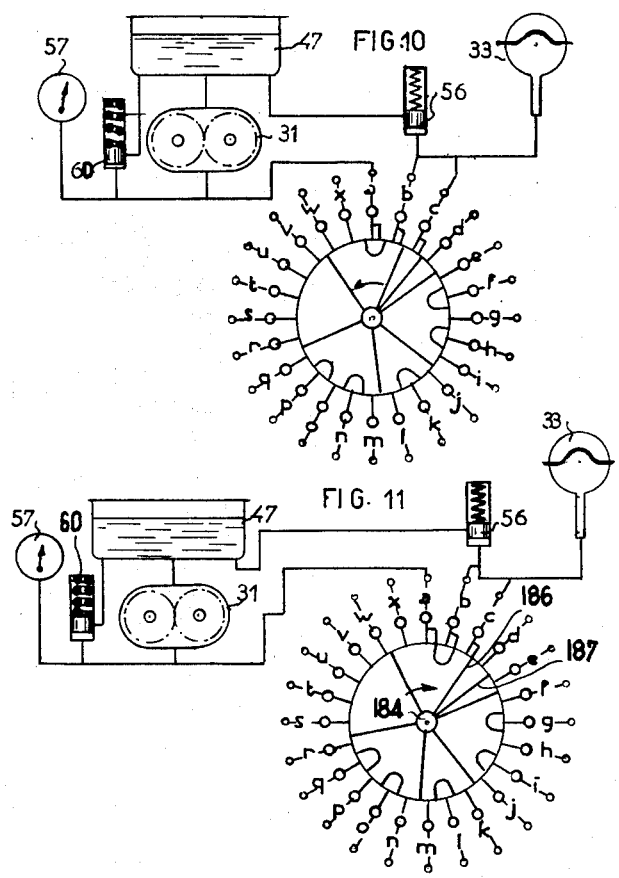

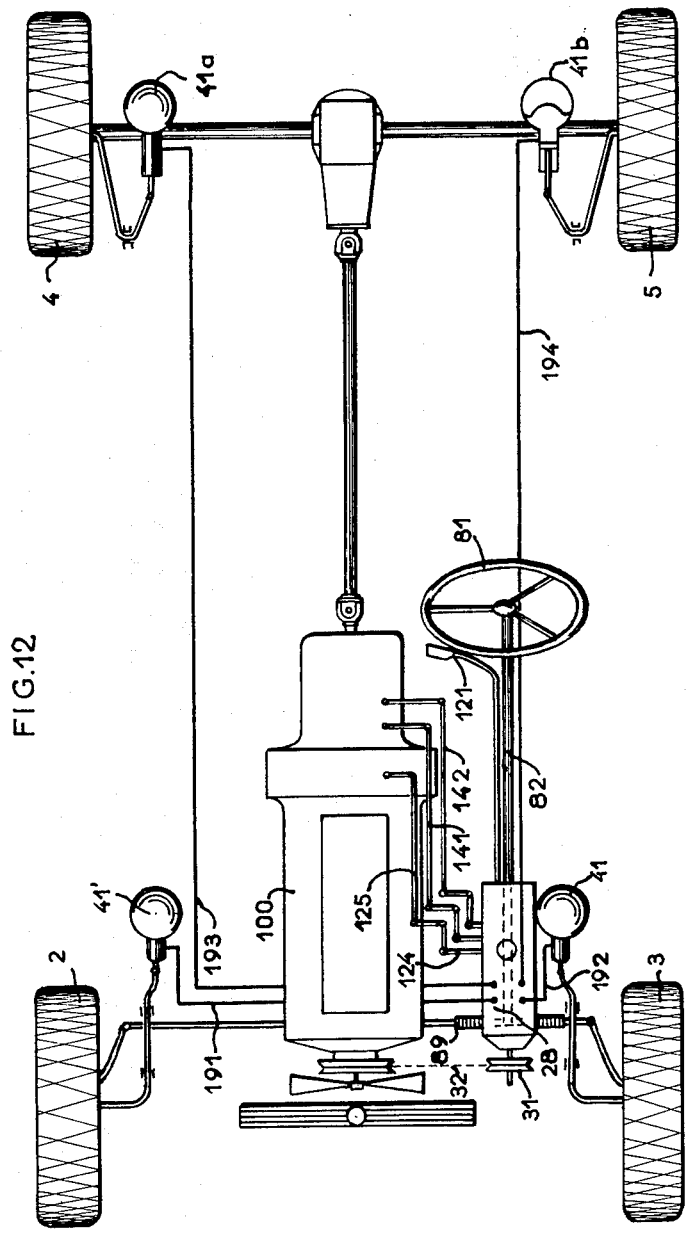

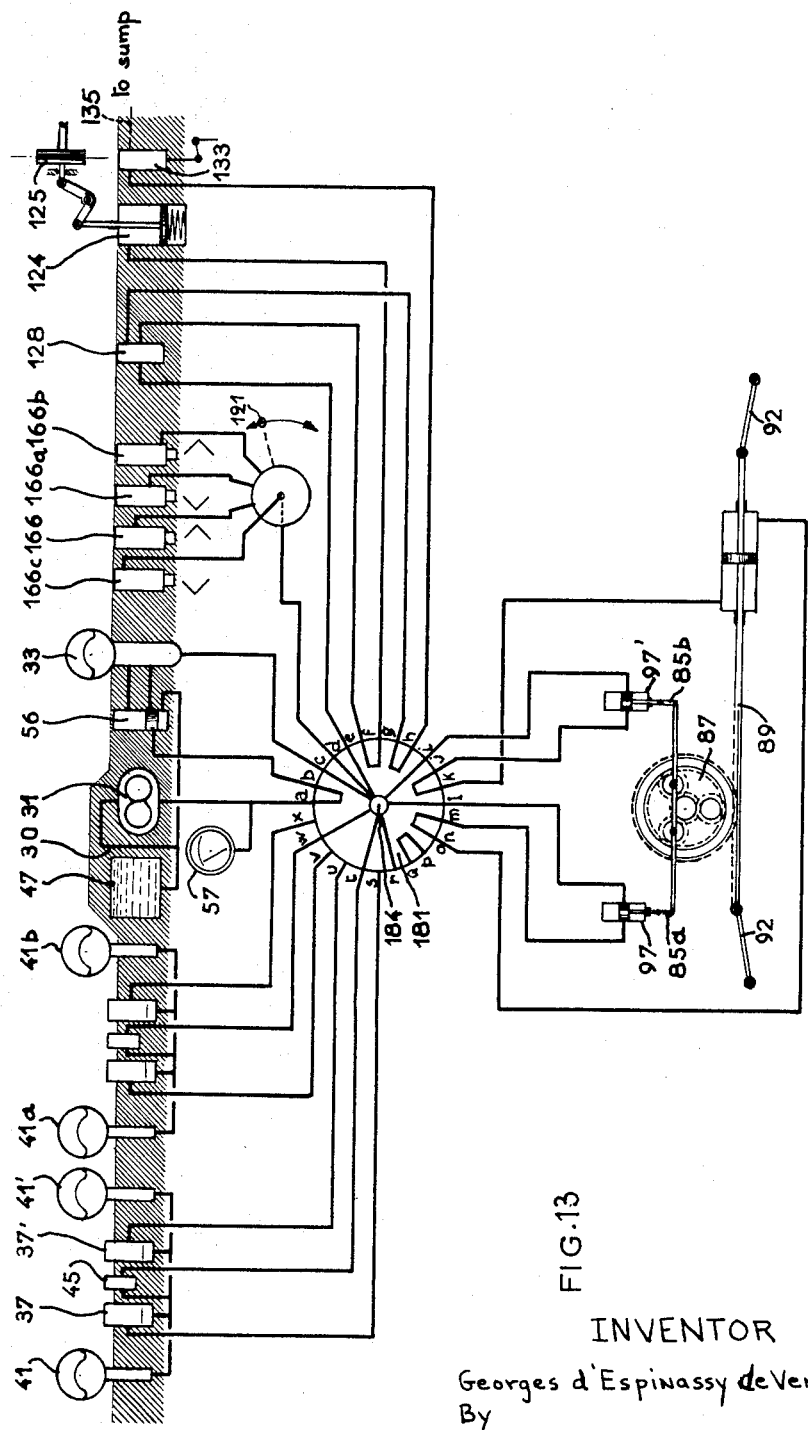

United States Patent Office 3,207,254
Patented Sept. 21, 1965

1

3,207,254
FLUID POWER SYSTEM
Georges d'Espinassy de Venel, 19 Rue de Presboure,
Paris 16, France
Filed Mar. 23, 1961, Ser. No. 97,785
Claims priority, application France, Mar. 26, 1960,
822,552; Feb. 22, 1961, 853,493
12 Claims. (Cl. 180—79.2)

This invention relates to fluid power systems in which mechanical work is performed by means of a liquid or gaseous fluid at superatmospheric or subatmospheric pressure, applied to suitable mechanical actuators such as cylinder-and-piston motors or other fluid servo-motors.

The invention is especially though not exclusively directed to fluid power systems provided on motor vehicles for performing a variety of ancillary mechanical functions therein, such as power-steering, wheel-suspension, gear shifting, clutch actuation, and the like.

Power-assistance is being used more and more frequently in modern automobiles for performing numerous functions, thereby considerably increasing driving comfort and safety. However, such fluid power servo-systems unavoidably bring with them an increased complexity especially due to the multiplicity of fluid piping, seals and relatively delicate mechanisms such as pumps, servo-valves and the like. The possibility of malfunction is thereby multiplied by a high probability factor no matter how much care is exerted during the manufacture and testing of the parts. Moreover, the maintenance and repair of such parts are difficult, requiring the services of highly trained personnel, and are not within the skill of the average garage mechanic and are consequently expensive. These considerations have heretofore seriously impaired the development of the otherwise highly desirable servo-devices especially in low- and medium-priced cars.

It is an object of this invention to overcome these difficulties by enormously simplifying maintenance operations on the hydraulic (or other fluid) servo-systems on motor vehicles; another object is to construct such servo-systems in such a manner that defects therein will be less liable to occur, so that when they do occur the defective part or device can be quickly identified and located without having to dismantle any of the system, and the identified part can then quickly and easily be dismounted for repair or replacement.

According to the invention, there is provided in a fluid power system for performing mechanical work by means of a fluid medium and in which a source of said fluid at superatmospheric or subatmospheric pressure is connected in circuit with a plurality of fluid operated devices, a multi-positional distributor connected in said circuit and selectively displaceable to different positions in each of which only a single one of said devices is effectively connected with said source so as to permit the individual testing of the operation of any one of said devices by a simple displacement of said distributor to a corresponding position.

It thus becomes possible at any time to check individually, and one by one, each of the circuits or circuit portions that may include a particular device liable to malfunction. Assuming for example that an abnormal drop in pressure is observed in the system as a whole, the location of the leak, i.e. the defective device or conduit can be immediately located by means of the distributor of the invention. Heretofore in similar circumstances it was necessary to proceed with a thorough and tedious investigation of all the circuit portions of the system in succession to discover the defective component.

According to another and highly advantageous feature of the invention, as applied to a novel design for a motor vehicle, the whole of the fluid power components of the servo-system of the vehicle are arranged within a sealed casing, which contains the fluid pressure source, the fluid servo-motors, the associated control valves, the connections between the foregoing, as well as any other hydraulic or pneumatic equipment. Thus the sealed casing or block is connected with the exterior by way of mechanical connections only, which will include both ingoing connections such as the drive means for the power source (pump) from the vehicle engine, linkages from the steering wheel and changespeed lever and the like, as well as the outgoing connections from the fluid servo-motors to the various parts of the vehicles that are to be actuated thereby, such as the steerable wheels, clutch, shifting gears and the like.

With such an arrangement all extensive piping throughout the vehicle chassis is completely eliminated, reducing the dangers of damage by external impact, corrosion and similar causes. Similarly, most of the seals that have had to be provided heretofore are hereby dispensed with; most of the causes of trouble that have hitherto beset hydraulic and pneumatic servo-installations on automobiles are removed.

However, the invention is also applicable to existing vehicle designs without requiring the somewhat drastic modifications in construction methods and plant that would be necessitated by the integrated design last mentioned. In such applications, the invention contemplates the provision of distributor units together with the associated hydraulic conduits so dimensioned and shaped as to be directly mountable on an existing vehicle chassis in which all the hydraulic components are positioned at their usually allotted locations, and connectable with suitable points of the existent hydraulic circuit. The invention thus provides a very simple and low-cost improvement applicable to existing vehicles of the low-price class produced in large quantities, with only a minimum outlay of expense while enabling such low-priced cars to benefit from the improved service conditions provided by the invention.

Exemplary embodiments of the invention will be described with reference to the accompanying drawings, wherein;

FIG. 7 is a schematic vertical cross section showing the front hydraulic suspension means;

FIG. 8 is a longitudinal section made on line VIII—VIII of FIG. 1;

FIG. 9 is a general diagrammatic view of the invention illustrating the distributor means and the manner in which tests or checks are made therewith;

FIGS. 10 and 11 are partial diagrams corresponding to FIG. 9 for explaining certain specific testing operations;

FIG. 12 is a schematic plan view of a vehicle chassis embodying a modified form of the invention wherein the hydropneumatic wheel suspension means are retained at their conventional locations near the related wheels and outside the hydraulic block of the invention; and FIG. 13 is a diagram illustrating the invention in one of its broadest aspects.

Figure 1:
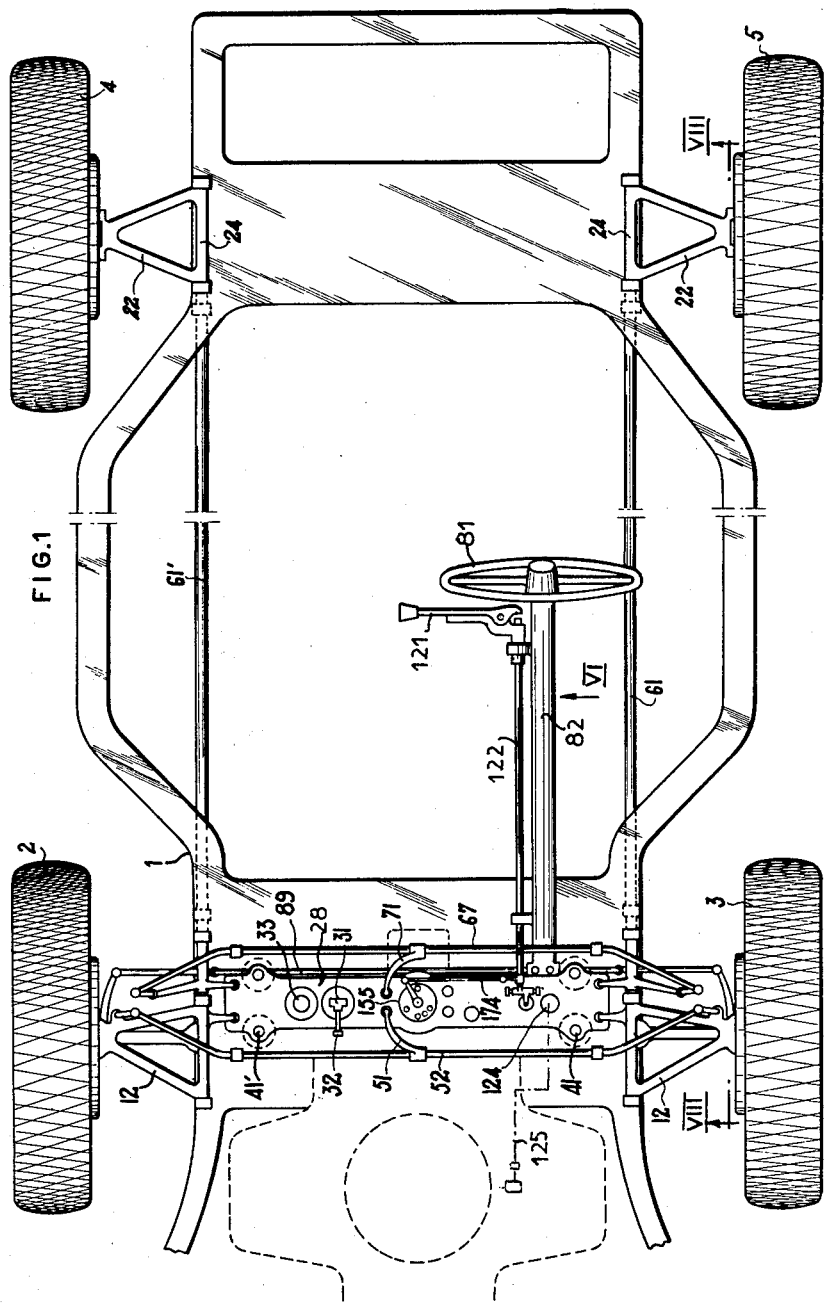
FIG. 1 is a schematic plan view of an automobile chassis with the invention applied thereto in one of its forms.

Referring especially to FIGS. 1 and 8, an automobile chassis generally designated 1 as shown supported on two front wheels 2 and 3 and rear wheels 4 and 5. Each front wheel such as wheel 2 is journalled on an axle 8 supported from a part 9 which in turn is pivoted to the free ends of a pair of vertically spaced triangular arms or levers 12 and 13 having their upper, horizontal, sides or bases 14 and 15 respectively pivoted to the chassis about longitudinally extending axes. Each of the rear wheels, e.g. wheel 4 is mounted in generally similar manner, being journalled on a wheel axle 18 secured to an arm 19 pivoted to the vertically spaced triangular levers 22, 23 having their upper bases 24, 25 pivoted about longitudinal axes on the chassis 1.

All of the hydraulic mechanism and circuitry of the car, to be described in greater detail later, is contained in an integrated hydraulic unit or block generally designated 28 and supported from the chassis 1 through suitable means in a general position intermediate the front wheels 2 and 3 (see FIGS. 2 and 7). It is noted that the dimensions of hydraulic power block 28 has been somewhat exaggerated in the drawings in proportion to the remaining structure for purposes of clarity.

Block 28 contains an hydraulic pump 31 (FIG. 2) for pressurizing the hydraulic power fluid, the pump being driven from the vehicle engine 100 (FIG. 12) through a transmission generally designated 32. A hydro-pneumatic accumulator is shown at 33 and is connected to be supplied with pressure oil from pump 31, so as to provide a constant pressure source for the system.

Hydro-pneumatic suspension means are provided for the vehicle wheels and will be described in connection with wheel 3 (see FIGS. 2, 7 and 9). A lever arm 36 projecting from triangular bracket 12 has its free end engaging the upper end of a plunger piston 37 reciprocable in a cylinder 38 secured in the block 28 and connected by a duct 39 formed through the body of block 28 with the lower part of a first suspension sphere 41 supported on the top of unit 28. Sphere 41 is divided by a flexible diaphragm 42 into upper and lower compartments 41a and 41b. Upper compartment 41a contains a gas under pressure while lower compartment 41b contains pressure liquid delivered to it from conduit 39 through a branch conduit 43. A valve 45 comprising a valve spool slidable in a cylindrical valve casing 45a serves to connect the conduit 39 and hence conduit 43, selectively, with an inlet conduit 46 leading to the pressure oil accumulator 33 or to an exhaust line connected with the sump 47, and serves to compensate for variations in vehicle loading (front trim compensation). The other front wheel 2 is provided with similar suspension means and the corresponding components relating thereto have been designated with the same references primed.

Engaging the upper end of the valve spool 45 is a finger 51 depending from a transversely extending bar 52 termed the front anti-roll bar, journalled on chassis 1 so as to be pivotable about its longitudinal axis. The opposite ends of bar 52a are connected through links 52a and 52b with the upper arms 12 and 12' of wheels 2 and 3 respectively. Compensator valve spool 45 is biased in an upward direction by a compression spring 53 towards a position in which the valve establishes connection from the oil pressure inlet line 46 to the lower compartments of the respective suspension spheres 41 and 41'. The system further includes a filler plug 55 for filling the hydraulic system, a safety release valve 56 and a pressure gauge 57.

The rear wheels have generally similar hydropneumatic suspension means associated therewith. Thus in relation to rear wheel 5 the system comprises a longitudinal bar 61 (FIG. 8) having its rear end secured to the base 25 of the lower triangular arm 23 of rear wheel 5 in alignment with the pivot axis of said arm, and suitably journalled in the chassis 1. From the forward end of bar 61 projects an arm 62 connected by a link 63 with a lever 64 (also see FIG. 2) pivoted about an axis in alignment with the pivot axis of the upper triangular arm 14 supporting the front wheel 3 on the same side of the car. Lever 64 has a finger 64a projecting therefrom (see FIG. 2) into pressing engagement with the top of a plunger piston 65. Plunger 65 cooperates with a rear suspension sphere 66 in a manner similar to the cooperation of plunger 37 with front suspension sphere 41. Also, similarly to the front suspension means described, there is provided a rear transverse anti-roll bar 67 connected at its opposite ends through links 68, 68', with the levers 64, 64' and having a finger 71 projecting therefrom into pressing engagement with the top of a valve spool 72 serving to compensate for variations in rear loading of the vehicle, and constituting a rear lateral trim valve. Thus it will be seen that the hydraulic components of both the rear wheel suspension means and the front wheel suspension means are all contained within the forwardly positioned hydraulic block 28.

The vehicle is provided with power-assisted steering means. The steering gear in the selected embodiment is of an improved rack and pinion type. The steering wheel 81 is shown secured to the top of steering column 82 having a sun gear or pinion 83 secured to its lower end (FIG. 4) surrounded by a planetary-carrier 85 in which three equispaced planetary pinions 84 are mounted for meshing engagement with the sun pinion 83. The planetaries 84 all mesh further with an internal gear annulus 86 coaxially surrounding the planetary carrier and constituting an outer orbit gear, and having an externally toothed gear annulus 87 secured to it which meshes with a rack 88 secured to a side of the transversely shiftable steering bar 89. The ends of bar 89 are respectively connected through bell-crank levers 91, 91' and links 92, 92' with the supports of front steerable wheels 3 and 2.

Projecting from the sides of planet-carrier 85 are a pair of opposite arms 85a, 85b, the ends of which engage the outer ends of the respective plunger pistons 95, 95' slidable in the cylindrical casings of respective steering valves 97, 97' and biased outwardly by springs 96, 96'. The valves 97 and 97' serve to control the flow of pressure oil from an inlet line 102 connected with pressure oil accumulator 33 to the respective end chambers 101a, 101b of a hydraulic steering servo-motor or actuator 101, and the flow from said chambers to the exhaust line 103 connected with the sump. The steering motor includes the piston 105 which is secured to one end of the steering bar 89. The steering gear and steering valves operated in an oil-filled chamber 106.

Figure 6:
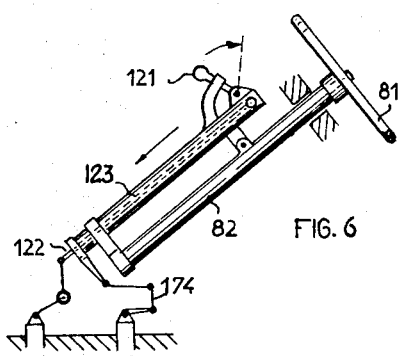
FIG. 6 is a partial side view as seen in the direction shown by arrow VI in FIG. 1.

The vehicle described is of a type in which the clutch operation is semi-automatically performed to disengage the clutch on changing gears. The gear changing and declutching operations are hydraulically assisted. The change speed lever is shown at 121 (FIGS. 1 and 6) as being mounted on the steering column 82 under the steering wheel. Speed change lever 121 is connected with the upper end of a rod 122 extending through a tube 123 supported alongside the steering column 82 for pivotal motion about rod 122 which is shiftable within tube 123 along its longitudinal axis. The axial shifting motions of rod 122 serve to operate the clutch to its disengaged and engaged positions while the rotational motions of tube 123 serve to change speeds.

The power-assisted clutch operating system will first be described. This comprises a hydraulic clutch actuator 124 (FIG. 3) including a single-acting cylinder and a piston slidable therein the piston being connected through linkage diagrammatically indicated at 125 (also see FIG. 2) with a clutch-operating member not shown. Downward displacement of clutch actuator piston 124 in opposition to the clutch springs diagrammatically indicated at 126 serves to disengage the clutch. Clutch actuator 124 is controlled by a clutch actuator valve 128 including a valve member biased by a spring 129 toward an outward position in its valve casing in which position the connection from the clutch actuator cylinder upper-chamber to a pressure oil inlet line 130 is cut off and the connection from said cylinder chamber to an exhaust line 132 is established so that the clutch actuator piston 124 is normally urged to its upward position for engaging the clutch. Clutch valve 128 is depressible through linkage indicated at 131 on downward movement of the control rod 122, produced by upward movement of the outer end of changespeed lever 121 as the driver operates the lever to change gears. Immediately on completion of a gear changing operation the clutch actuator cylinder is exhausted through exhaust line 132, which is controlled by a valve 133 biassed by a spring 134 to a position in which the exhaust line 132 is cut off, and displaced to a position in which the exhaust flow is established to outlet line 135 leading to sump 47, by means of the speedchange mechanism as presently described.

Figure 3:
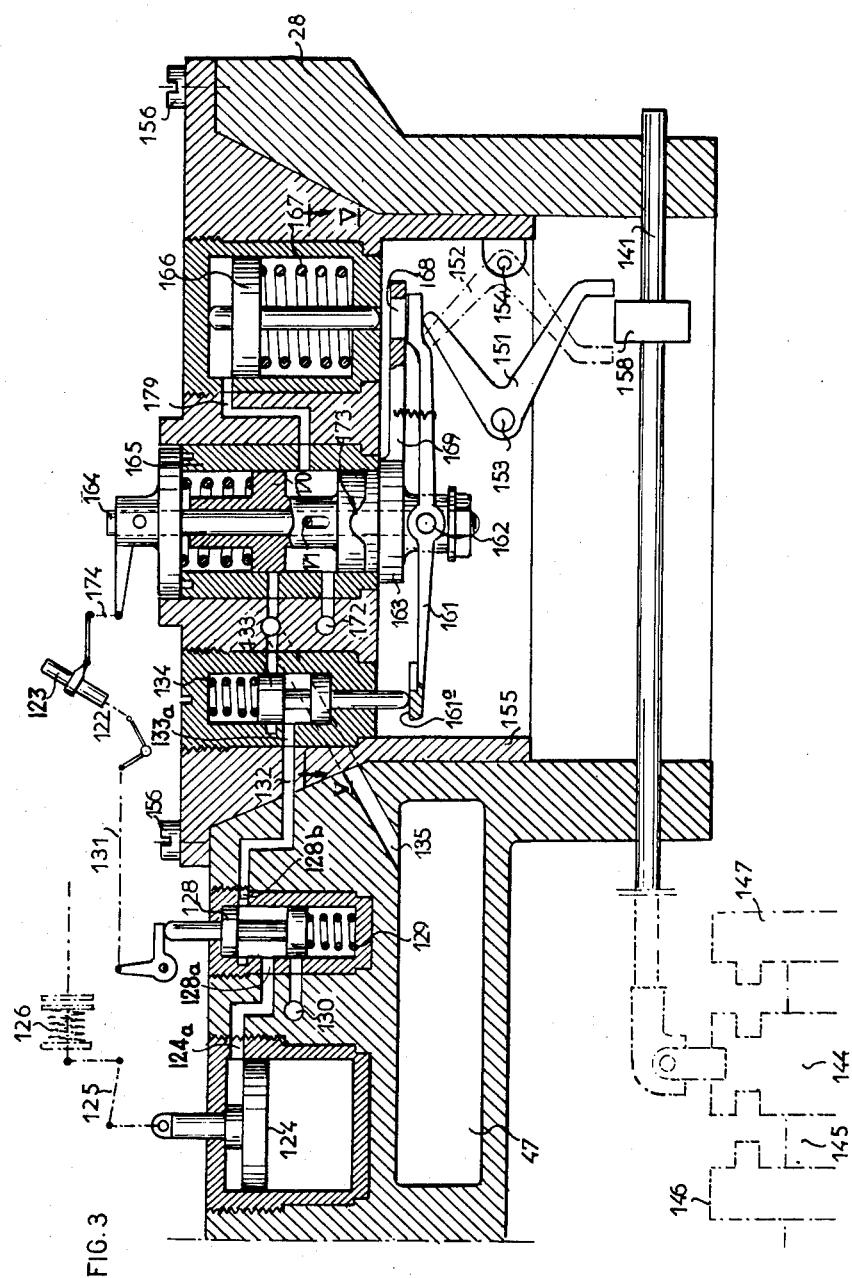
FIG. 3 is a section substantially on line III—III of FIG. 2, drawn to a still larger scale.

The speedchange gear diagrammatically shown in FIG. 3, left bottom, is of the conventional slider gear type operated by a pair of longitudinally slidable rods 141 and 142 (also see FIG. 12). Thus rod 141 is connected at its free end by way of a conventional shifter fork with a shift collar 144 slidable on shaft 145 for selective dog-clutch engagement with either of the gears 146, 147. Each of the rods 141, 142 is axially displaceable in either direction by the action of bellcrank levers 151, 152 pivoted on fixed pivots 153, 154 mounted in a cylindrical support 155 secured as with screws 156 in the body of unit 28. The levers 151 and 152 have their one ends engageable with collars such as 158 secured to the respective bars 141 and 142 and are actuated at their other ends by the pressure exertable thereon by one end of a two-armed lever 161 which is pivoted at 162 at its midpoint on a rotatable selector hub 163. Thus, in rotation of selector shaft 164 to a suitable position for engaging lever 161 with a selected one of the bellcrank levers 151, 152, lever 161 can be pivoted to rotate the selected bellcrank lever about its pivot 153, shift the related rod 141 axially to either of its end positions each corresponding to a particular desired gear ratio in a conventional manner. The selector hub 163 is mounted for free rotation on a pivot 164 coaxial with the cylindrical liner 155 and secured to a rotary hydraulic valve 165. For acting on the lever 161 to depress bellcrank lever 151 and acetate the gear shifter rod 141 or 142 there is provided a single-acting hydraulic actuator including an actuator piston 166 slidable in a cylinder and urged in an upward direction by spring 167. The piston 166 can be depressed to actuate bellcrank levers 151, 152 by delivery of pressure oil to the upper chamber of the cylinder through a supply duct 179 from the valve 165.

Secured to the rotatable selector hub 163 is a projecting locking arm 169 which is formed with a hole 168 allowing the piston 166 to pass therethrough to act on lever 161 and therethrough on bellcrank lever 151, 152. The locking member 169 serves to prevent simultaneous engagement of more than one gear as will later become apparent.

The two-armed lever 161 has an arcuate member 161a carried at its free end for actuation of a plunger projecting from the valve spool of the previously mentioned exhaust control valve 133 for a purpose that will appear later.

Selective actuation of valve 165 is produced by the pivotal rotation of rod 122 about its axis on the changespeed lever 121 being rotated to change gears. For this purpose rod 122 is connected with the sector 165 through linkage schematically indicated at 174.

Figure 5:
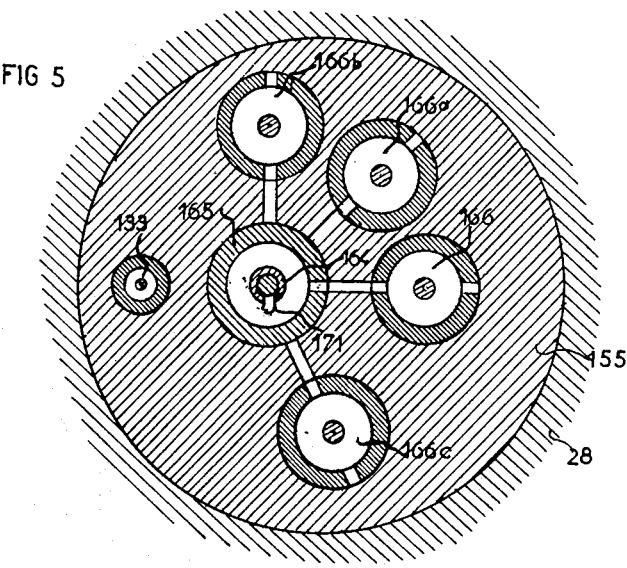
FIG. 5 is a similar section on line V—V of FIG. 3.

It will be understood that there are provided as many hydraulic gear actuators such as 166 as there are gears. In the example shown (see FIG. 5) actuator 166 corresponds to first gear, actuators 166a and 166b to second and third gears respectively; and actuator 166c corresponds to reverse gear.

Slidably but non-rotatably mounted on shaft 164 within valve 165 is an annular valve member 170 pinned to pivot 164 by a pin 171. Member 170 is positionable to establish communication between the upper cylinder chamber of actuator 166 and the pressure inlet line 172 or with reservoir line 135 selectively. Axial displacement of member 170 is caused by a camface 173 provided at the bottom end of hub member 163 as will be later clarified.

The general layout of the hydraulic system is illustrated schematically in FIG. 9 as including the oil reservoir or sump 47, the pump 31, the hydro-pneumatic accumulator 33, and the pressure limiting valve 56. A further valve 60 serves to test the operation of the pump at increased pressure in a special testing circuit in which the pump, sump and testing valve 60 are connected. The power-assisted steering system is diagrammatically indicated as comprising steering wheel 81, steering column 82, steering bar 89 coupled with the column by way of the orbit gear annulus 87 and connected with steering actuator 101. The power-assisted change speed gear schematically indicated as including chiefly the rotary selector 165 associated with the four gear actuators 166, 166a, 166b, 166c, and the gear shift and clutch controls. The diagram also shows the two front suspension spheres 41 and 41' and the related suspension actuators 37 and 37' and the front trim corrector actuator or valve 45.

Figure 2:
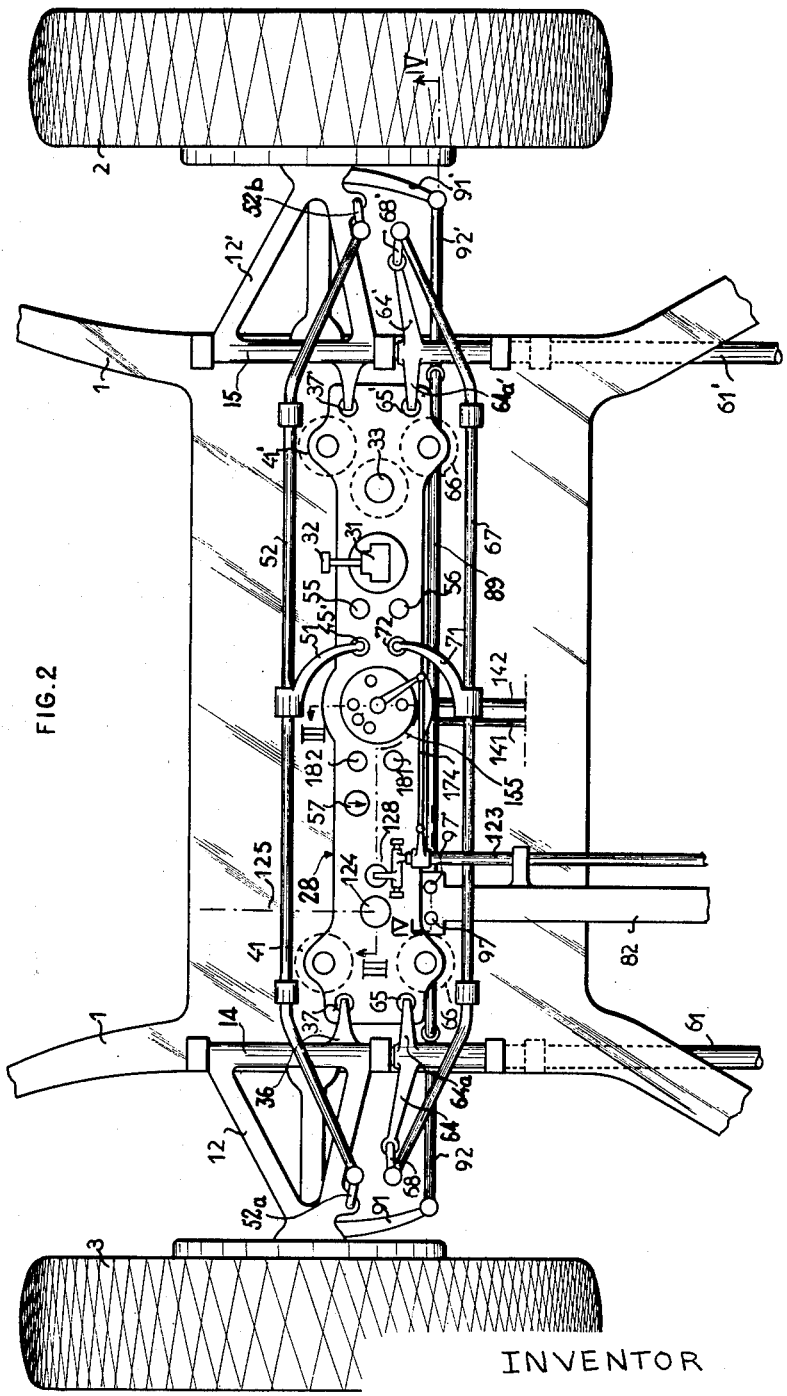
FIG. 2 is a larger-scale plan view of the front part of the chassis of FIG. 1 and an integrated hydraulic block according to the invention.

In accordance with a principal feature of the invention the system includes a pair of rotary distributors, an operating distributor 181 and a testing selector or distributor 182, best apparent in FIG. 9 but also shown in FIGS. 1 and 2. Each distributor comprises a cylindrical rotor pivoted about a center axis and formed with an axial duct 184, 185 respectively, the axial ducts of the two distributors being interconnected by a line 184a. Each distributor rotor is rotatable within a stator (not shown) which has a number of circumferentially spaced taps or openings designated $a$ through $x$, each of which (or each of some of which) is connected through means not shown with a particular portion of the hydraulic system as will later be described. The rotors of the two distributors differ from each other. Test distributor 182 has a single radial duct 183 leading from its axial duct 185 and connectable with any one of the taps $a$ through $x$ depending on the angular position of the rotor. The rotor of operating distributor 181 is formed with a number of radial ducts 186, 187, 188, 189, 190, 191 and 192, and also with a number of hairpin-contoured ducts 193 to 198 adapted to interconnect two adjacent taps $a$ through $x$ without connecting them to the axial duct 184.

Figure 4:
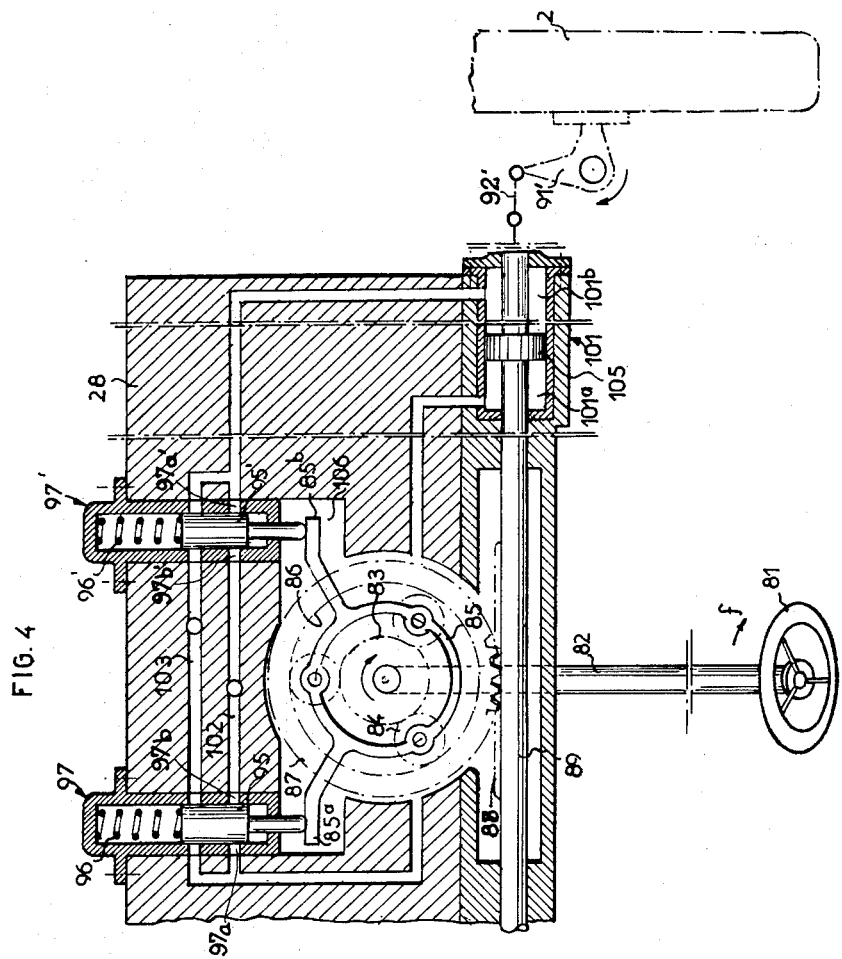
FIG. 4 is a section on line IV—IV of FIG. 2 on substantially the same scale as FIG. 3.

Referring to the distributor connections in detail, taps $a$, $b$ and $c$ relate to the pressure input of the system and specifically tap $a$ is connected to the delivery line of pump 31, and taps $b$ and $c$ are connected to the pressure accumulator 33. Taps $d$ through $i$ are assigned to the clutch and gear shift portion of the system; specifically tap $d$ is connected with the inner space of gear selector 165 by way of the inlet line 172 shown in FIG. 3; tap $e$ connects with the inlet line of lock valve clutch actuator valve 133 by way of inlet line 130 shown in FIG. 3; tap $f$ is connected with and aperture 128a in the body of valve 128 shown in FIG. 3 and tap $g$ is connected with and aperture 124a in the top of clutch actuator 124. Taps $f$ and $g$ are adapted, in the operative condition of distributor 181 shown, to be interconnected by a U-duct 194 of the distributor rotor and for clarity the corresponding apertures 124a and 128a have been shown as interconnected in FIG. 3, though it should be understood that actually their interconnection is effected by way of distributor 181. Moreover, in the position shown, taps $c$, $d$ and $e$ are connected by radial ducts 186, 187 and 188, respectively, of the distributor rotor to the axial duct 184. Tap $h$ connects with an aperture 128b of clutch actuator valve 128 (the aperture shown connected with line 132 in FIG. 3) and tap $i$ connects with an aperture 133$a$ of clutch and gear lock valve 133, and these two apertures 128$b$ and 133$a$ are normally interconnected by a corresponding U-duct 195 in the rotor of distributor 181 and have accordingly also been shown, for clarity, as permanently interconnected in FIG. 3. Taps $j$ through $o$ are assigned to the power steering portion of the system; specifically taps $j$ and $m$ which, in the operative position of the distributor are connected through respective radial ducts 189 and 190 of the distributor stator with axial duct 184 and hence with the accumulator pressure at tap $c$, are connected with the pressure intake line (designated 102 in FIG. 4) for the steering valves 97 and 97′ respectively; taps $k$ and $n$ are connected with apertures 97$a$ and 97$a'$ in said steering valves 97 and 97′ respectively, which are shown in FIG. 4 as being aligned with the respective input apertures 97$b$ and 97$b'$; and taps $l$ and $o$ are connected with the respective chambers 101$b$ and 101$a$ of steering actuator 101. In the operative position shown in FIG. 9, it will be noted that taps $k$ and $l$ are interconnected by a U-duct 196 of the distributor rotor and taps $n$ and $o$ are interconnected by another U-duct 197 of said rotor; for clarity the orifices 97$a$ and 97$a'$ have been shown in FIG. 4 as being permanently connected to chambers 101$a$ and 101$b$.

The remaining taps of the distributor 181 are assigned to the hydraulic suspension function, in part to the rear wheel suspension and in part to the front wheel suspension. The corresponding connections have only partly been shown in FIG. 9 nor will they be described in detail since the general scheme thereof will be evident by analogy with what has been described above. It is again noted that certain of the interconnections that have been illustrated (and implied in the description) as permanently made in the detail views such as FIG. 7, are actually established through ducts such as 191, 192, 198 of the rotor of distributor 181 when in the operating position shown.

It will be understood that any number of additional connections or taps may be made in the stators of the distributors 181 and 182 for any desired hydraulic functions additional to those described in the present embodiment, e.g., for a hydraulic braking system.

The above description of the distributor stator connections applies to both the operating and the test distributors 181 and 182. While the rotor of operating distributor 181 is only able to assume three different angular positions as shown in FIGS. 9, 10 and 11 respectively, for purposes that will presently appear, the rotor of test distributor 182 on the other hand is able to assume any angular position for connecting its single radial duct 183 with any one of the taps $a$ through $x$, as may be required for testing any particular hydraulic circuit.

The description of the system will now be carried forward in terms of its general operation. In the normal operating condition the test distributor 182 is in a neutral position as shown in FIG. 9, with radial duct 183 cut off from any of the circuit connections $a$ through $x$. The operating distributor 181 is in the position shown in that figure. In this position of distributor 181 it will be seen that, with the vehicle engine running so that oil pump 31 is operating, oil is drawn from sump 47 through line 30 and thence passed by way of the circuit connections $a$ and $b$ of distributor 181 interconnected by a U-connection, into pressure accumulator 33 by way of pressure limiter valve 56. Oil at a high constant pressure is thus made available by accumulator 33 for operating the various parts of the system which will now be considered in succession.

As regards the front wheel suspension (FIG. 7) high pressure oil from accumulator 33 is passed from pressure inlet 46 through the front trim corrector valve 45 into both suspension spheres 41 and 41′ where the gas pressure in the upper sphere compartments acts through diaphragms 42, 42′ to stabilize the elastic pressure force of the oil. The oil pressure is supplied in parallel to the under sides of the two front suspension actuators or plungers 37 and 37′ and actuates therethrough the pivoted suspension arms 12–13 and 12′–13′ to stabilize the front wheels against impacts. Trim valve 45 serves to adjust the suspension pressure acting on the wheels in accordance with the forward load of the vehicle. The operation is generally the same in regard to the rear wheel suspension, the pressure oil being conducted from the accumulator through the rear trim corrector valve 72 to the rear suspension spheres 66 and 66′ and in parallel to the under faces of the rear suspension plungers 65 and 65′ to act through arms 64 and 64′ and longitudinal bars 61 and 61′ on the rear wheel suspension arms.

The power steering system will now be described. Rotation of steering wheel 81 e.g. in the direction of arrow $f$ (FIG. 4) rotates inner sungear 83 in the same direction. Since the outer orbit gear 86 is secured to annulus 87 meshing with steering rack 88, orbit gear 86 can be considerd fixed so that the planet gears are forced to roll along the gearteeth or orbit gear 86, rotating carrier 85 in the same direction (clockwise in FIG. 4). Finger 85$a$ therfore exerts upward pressure on valve member 95 of steering valve 97, while simultaneously finger 85$b$ is somewhat lowered to permit downward movement of valve member 95′ of the other steering valve 97′ under the pressure of spring 96′. The pressure oil delivered from accumulator 33 through inlet line 102 is thus allowed by valve member 95 to flow to the left hand chamber 101$a$ of the valve steering actuator 101, while oil from the other actuator chamber 101$b$ is allowed by valve member 95′ to flow to exhaust through line 103. The piston of actuator 101 is thus displaced rightward carrying steering bar 89 with it to deflect the front wheels 2 and 3 through steering arms 91 in a direction corresponding to that in which the steering wheel 81 was turned. Simultaneously, rightward displacement of bar 89 moves rack 88 which rotates annulus 87 and 86 counterclockwise thereby restoring the steering valve and gear to its neutral relative position in the conventional follow-up action. If the steering wheel 81 were turned in the reverse direction from that above the action would of course be similar and reverse from that described, with the actuator chamber 101$a$ being connected to exhaust through steering valve 97 and exhaust line 103 and chamber 106 being connected to accumulator pressure through steering valve 97′ and inlet line 102.

The power assisted declutching and gear changing system will now be described. To shift gears speedchange lever 121 is first raised to produce a downward axial movement of rod 122 and through linkage 131 downward displacement of valve member 128 (FIG. 3). Thereafter speedchange lever 121 is rotated to rotate tube 123 about its axis to an angular position corresponding to the desired gear, and lever 121 is then released and allowed to drop back to its normal position. The downward displacement of valve member 128 enables oil under pressure from pressure inlet line 130 to flow to the upper chamber of actuator 124, depressing the piston therein and acting through linkage 125 to disengage the clutch against the action of clutch spring 126. Even though valve member 128 moves up again actuator piston 124 remains locked in its depressed, clutch-engaging, position since the exhaust line for the actuator is cut off by the valve member 133 positioned as shown. Rotation of the speedchange lever 121 and rod 122, acting through linkage 174, rotates speed selector 165 to a position corresponding to the selected gear, e.g. first gear, i.e. with aperture 168 positioned in register with the first gear actuator piston 166. It is noted that the selector 165 is only rotated after the rod 122 has been displaced to its lower position. With selector 165 rotated to first-gear position a flow circuit is established therethrough for pressure oil from pressure inlet 172 through the selector 165 into the upper chamber of gear actuator 166, forcing the actuator piston downwards through hole 168, and rotates the two-armed lever 161 about its pivot 162 and the related bellcrank lever 151 the lower end of which acts on collar 158 to displace shift bar 141 axially in the direction required to engage the shifter clutch member 144 with the related first-gear pinion 146.

As the two-armed lever 161 has rocked clock-wise to engage the desired gear, its opposite extension 161a has moved valve spool 133 upward, permitting the pressure oil trapped in the upper chamber of clutch actuator 124 to be exhausted through line 135 to the sump 47. The clutch is thereupon allowed to be moved to engaged condition by clutch spring 126 and the previously-set first gear is thus clutched-in.

The pressure oil remains trapped in the upper chamber of first gear actuator 166 so that actuator piston 166 is locked in its depressed position to lock the lever 161 in its clockwise-rotated position, thus holding the shifted gear in engagement. Clutch actuator 124 on the other hand is retained in its upward, clutch-engaging, position since locking valve member 133 is retained in its upwardly displaced position by the part 161a. This condition obtains so long as the car is running in first gear. Assuming the driver now wishes to shift to second gear for example, speedchange lever 121 is again actuated as described, and this action again produces downward movement of clutch actuator 124 to its declutching position. Moreover, rotation of rod 122 acts to exhaust the upper chamber of the gear actuator 166 previously locked in engaging position, by the process now to be described: Since the hub 163 of the selector member is now blocked against rotation by the rod of piston 166 engaged in hole 168, rotation of rod 122 effected by the driver on shifting the speedchange lever from first to second gear position, causes rotation of selector sleeve 165 relative to hub 163 and consequent upward displacement of spool 170 due to the coaction of the cam surfaces 173. The spool 170 on rising disconnects the line leading to the upper chamber of gear actuator 166 from the inlet line 172 and connects it with the exhaust line 135, whereupon gear actuator piston 166 is allowed to rise by the action of spring 167. Selector hub 163 is now released for rotation and rotates lever 161 to an angular position registering with the actuator (e.g. 166a) corresponding to the newly-selected, e.g. second gear.

Thus, it will be seen that with the operating distributor 181 of the invention positioned as shown in FIG. 9, all of the hydraulic power units grouped in the power block 28 are correctly operated to ensure power-assisted performance of the ancillary functions including suspension, steering, clutching and gear shifting.

The means provided according to the invention for testing the individual components of the hydraulic system will now be described. As a general proposition these tests are performed by rotating the operating distributor 181 to a neutral position and selectively rotating the test distributor 182 to positions corresponding to the system components to be tested. However, there are two preliminary tests which are carried out by keeping test distributor 182 in its neutral position (FIG. 9) and actuating the operating distributor 181, and these two tests will first be described.

First, to test the output of the main oil pump 31, the rotor of operating distributor 181 is placed in a neutral position (FIG. 10) in which all of the rotor ducts are out of register with the stator connections a through x. In this condition it is clear that the pressure gauge 57 will indicate the pump delivery pressure (as determined by pressure-limiting test valve 60) and thus indicate whether the pump is operating correctly.

Secondly, to test the correct operation of the hydropneumatic accumulator 33 and subsidiarily pressure limiter valve 56, the rotor of operating distributor 181 is placed in the position shown in FIG. 11 while test distributor 182 is retained in a neutral position. In this position it will be seen that the interconnections are such that pump 31 delivers pressure oil to the lower chamber of accumulator 33 by way of distributor taps a and b so that pressure gauge 57 will now indicate the accumulator pressure. It is noted that in this position the accumulator pressure is also supplied through stator tap c and the axial duct of the distributor rotor to the distributor-interconnecting line 186 for equalization of the distributor pressures. It is also noted that each of the stator taps a, b and c is provided with dual outlets (or an elongated outlet) into the distributor rotor chamber to provide the desired interconnections through the rotor ducts both in the normal operating rotor position of FIG. 9 and the accumulator testing position of FIG. 11.

With the rotor of operating or main distributor 181 positioned as shown in FIG. 11, and after the accumulator test last described has been performed, any individual component of the hydraulic system can be tested by simply rotating the rotor of test distributor 182 to a position in which its single radial duct 183 connects with an appropriate stator tap corresponding to the system component or portion to be tested. Thus, if it is desired for example to check the proper operation of the gear selector 165, test distributor rotor is rotated until radial duct 183 connects with tap d; at this time accumulator pressure is conducted from the operating distributor tap c through radial duct 186 of the operating distributor rotor, axial duct 185 equalizing line 184a, axial duct 185, radial duct 183 to tap d of test distributor 182 and thence to the input line 172 (FIG. 3) of the selector 165 owing to the connections previously described. Thus only said selector intake line 172 is supplied with accumulator pressure, and the pressure gauge 57 will indicate the pressure effectively applied to the selector. It will readily be understood that by thus displacing the rotor of test distributor 182 sequentially or in any desired order to its various angular positions, an extremely quick and simple yet efficient check of each individual component of the intricate hydraulic system can be made, and any defective component immediately identified for repair or replacement.

In the modified construction illustrated in FIG. 12, all of the components illustrated are essentially the same as in the first embodiment described and have been designated by the same reference numerals. The hydraulic block 28 has here been shown in a different location from that in the first embodiment, specifically located adjacent (or surrounding) the steering gear; this difference is minor and serves to indicate that any convenient location can be chosen for the block 28. The chief difference of the embodiment of FIG. 12 lies in that the four wheel suspension spheres 41, 41', 41a and 41b are here positioned adjacent the respective wheels served by them, in accordance with conventional construction, and are connected with the related hydraulic components such as 45, 37, 37' of FIG. 7, by way of hydraulic lines 191, 192, 193 and 194 leading into the hydraulic block 28. All of the remaining portions of the system including the power-steering, clutch and gear shifting portions may be similar to those earlier described. The checking of all the individual components, including the hydraulic suspension spheres, can be accomplished in identically the same way as described above with reference to FIG. 9, using the operating and testing distributors 181 and 182.

It will be understood that not only the hydraulic suspension devices (as shown in FIG. 12) but any other of the hydraulic components of the complete system may be positioned outside the unitary hydraulic block such as 28 while retaining the basic feature of the invention which lies in the provision of distributor means for selectively connecting any desired one of a plurality of hydraulic components of the power system to the pressure source (and pressure gauge) while isolating said selected component from all the other components of the system, whereby an immediate indication of the operativeness of the selected component is obtained. The basic teaching is conveniently embodied in a vehicle power system wherein all or a majority of the system components are integrated in a single compact block or unit, as described with reference to FIGS. 1–11, but by no means necessarily so. According to one modification, all of the components may be grouped in two separate such blocks, which may then desirably be positioned respectively adjacent the front and rear wheels of the vehicle. In fact, it may prove desirable in many cases to dispense with the integrated-block feature completely or almost completely, and retain the hydraulic components of the system at their conventional locations as provided in present power-assisted vehicle constructions. This would have the advantage of involving only a minimum amount of modifications in fabrication methods and plant, a most important consideration in a large-output industry such as the automobile industry.

To illustrate this FIG. 13 illustrates in schematic form a vehicle power system according to the invention wherein all of the chief hydraulic components are shown arrayed in more or less arbitrary order and connected with the taps of a distributor 181. The test distributor 182 with its single radial duct has not here been shown but it will be understood that its taps can be considered as connected up in parallel with the respectively corresponding taps of distributor 181. The various elements in FIG. 13 have been given the same references as in the preceding figures and need not again be described. In the general scheme illustrated in FIG. 13, all (or any number of) the hydraulic components shown can be considered as being located at their respective conventional positions as already explained and connected with the distributor by way of separate hydraulic lines. In such an embodiment of the invention, it is contemplated that attachments comprising a distributor with a related set of hydraulic piping of appropriate size and configuration would be manufactured for direct mounting upon a motor vehicle of standard construction so as to permit of connecting the piping of the attachment to suitable points of the standard hydraulic power equipment of the vehicle without any modification in the latter beyond providing suitable taps or unions in the appropriate points of the standard hydraulic power system.

A number of other modifications may of course be introduced into the embodiments shown and described. The hydraulic components involved in the system are not necessarily restricted to the suspension, steering and clutch and gear shift functions considered but may include any other instead of or in addition to these. The specific construction of each of these power-assisted functions may of course differ very greatly from what is here shown for exemplary purposes. A hydro-pneumatic pressure accumulator is not necessarily used, since the pressure source may comprise a simple pump, with or without a high-pressure reservoir.

The invention is not restricted to hydraulic power systems but can readily be extended to any other fluid operated systems, including pneumatic systems, and in this connection the invention is applicable both to superatmospheric and subatmospheric (vacuum) pneumatic systems.

What is claimed is:

1. In a motor vehicle having propulsive motor wheels including propulsive wheels and steerable wheels, a variable-ratio transmission connecting said motor and propulsive wheels and including shiftable gears for varying the ratio of said transmission, a power-assisted steering system including a fluid-operated steering actuator mechanically connected for deflecting said wheels; a power-assisted transmission system including fluid-operated gear shift actuators mechanically connected with said shiftable gears for varying the ratio of said transmission; and a source of fluid pressure; and, for connecting the source simultaneously to all said actuators for normal operation of said power steering and transmission systems and individually to each of a plurality of actuators, the fluid pressure of which has to be checked, the provision of displaceable multipositional distributor means and fluid connections from said distributor means to said source and to said respective actuators.

2. A vehicle as claimed in claim 1, having fluid-suspension means for said wheels including fluid pressure-responsive suspension devices mechanically connected with said wheels for stabilizing said wheels in a vertical plane, and fluid connections from said distributor means to each of said suspension devices, means for connecting said suspension devices to said source in said operative position of the distributor means for normal operation of said suspension system and means for connecting each of said devices, with said source in further positions of the distributor means for testing said suspension system.

3. In a motor vehicle having a chassis, an engine supported on the chassis, wheels supporting the chassis and including propulsive and steerable wheels, a variable ratio-transmission connecting said engine and propulsive wheels including a clutch, shiftable gears for varying the transmission ratio and a speedchange lever; and steering gear for deflecting said steerable wheels including a steering wheel; the provision of a substantially sealed casing supported on the chassis; drivable pump means in the casing for providing a source of pressure fluid; a plurality of fluid-operable actuators in said casing; valve means in said casing for controlling the operation of said actuators; fluid flow lines within the casing connecting said source with said valve means and said actuators for operating the actuators from the source pressure; a mechanical connection extending through the wall of said casing from said engine to said pump means to drive the latter for providing a pressure source for said actuators; other mechanical connections extending through said casing wall from said steering wheel to the steering actuator valve means and from the steering actuator to said steerable wheels for operating said steering actuator to deflect the steerable wheels on rotation of the steering wheel and including steering follow-up means; further mechanical connections extending through said casing wall from said speedchange lever to said clutch and gearshift actuator valve means and from said clutch and gearshift actuators respectively to said clutch and shiftable gears for shifting said gears on displacement of the speedchange lever; whereby a substantially self-contained sealed fluid power-assistance unit is provided in said vehicle having substantially no fluid connections extending outside said unit.

4. In the vehicle claimed in claim 3, fluid operated suspension means positioned in said casing, fluid connections in said casing connecting said source with said suspension means and mechanical connections extending through the casing wall from said suspension means to said vehicle wheels for stabilizing said wheels in vertical planes.

5. In the vehicle claimed in claim 3, fluid operated suspension means mounted on said chassis adjacent the respective wheels and mechanically connected thereto, and fluid flow lines extending through the wall of said casing for connecting said suspension means with said source.

6. In the vehicle claimed in claim 3, a displaceable multipositional selector means supported in said casing for manual displacement from outside the casing, fluid connections within the casing from said selector means to said source and to said respective actuators and valve means, including means operable from outside the casing for displacing the selector means to a first position wherein it connects the source with all of said actuators and valve means for normal operation thereof, and for displacing the selector means to any of a plurality of testing positions in which it connects said source with selected ones of said actuators and valve means to check the individual operation thereof.

7. The vehicle claimed in claim 3, wherein said casing is mounted on the vehicle generally transversely between the front wheels thereof, and including fluid suspension means for said front wheels, said suspension means comprising suspension arms pivoted on horizontal axes and supporting said front wheels for stabilizing movements in a vertical plane, a pair of fluid-operated actuators mounted in said casing and connected with said source, said actuators having actuator pistons sealingly projecting from said casing for engagement by said respective wheel suspension arms.

8. In the vehicle claimed in claim 7, a pivoted roll-stabilizing bar extending transversely of the vehicle and having ends connected with said respective suspension arms, and a front trim-connector valve mounted in said casing and connected intermediate said source and said stabilizer actuators and sealingly projecting from said casing for engagement by a projection of said bar.

9. The vehicle claimed in claim 7 further including fluid suspension means for the rear vehicle wheels and comprising suspension arms pivoted on horizontal axes and supporting said rear wheels for stabilizing movements in vertical planes, a pair of fluid operated rear stabilizer actuators mounted in said casing and connected with said source, said rear stabilizer actuators having actuator pistons sealingly projecting from said casing, and bars extending longitudinally along the vehicle and having their rear ends connected with said rear stabilizer arms and having means projecting from front ends thereof for engaging said last-mentioned actuator pistons.

10. In a motor vehicle provided with a fluid pressure source and a plurality of fluid pressure responsive devices, a fluid pressure testing device comprising a stationary cylindrical casing having circumferentially spaced fluid ports, duct means connecting one of said ports with said source, fluid conductors between the other ports and said fluid pressure responsive devices, a gauge connected to said duct means, a disc shaped valve member rotatable in said casing, said valve member provided with an axial chamber and a plurality of radial ducts leading from said chamber to the periphery of said valve member, and a disc shaped testing member rotatable in said casing adjacent said valve member, said testing member being provided with an axial chamber communicating with the axial chamber of said valve member and being further provided with a radial duct extending from said chamber of the testing member to the periphery thereof, said valve member being rotatable between a first position in which said radial ducts of the valve member are in register with said ports and a second position in which one of said radial ducts is in register with said one port and the other radial ducts out of register with said other ports, and said testing member being rotatable so as to permit the positioning of its radial duct either in register with any of said ports or out of register therewith.

11. A testing device as claimed in claim 10, in which the number of said radial ducts of the valve member is smaller than the number of said fluid ports, and in which said valve member has at least one U-shaped duct adapted to interconnect two adjacent fluid ports when said valve is in said first position thereof.

12. In a fluid power system for operating a plurality of mechanical devices in a power assisted vehicle, including a source of fluid at an operating pressure, a plurality of fluid actuators having fluid connections connectable with said source and having mechanical connections connected with said devices for operating the latter, the provision of a displaceable multipositional selector means; fluid connections from said selector means to said source and to said respective actuators; said selector means being displaceable in a first position wherein it connects the source simultaneously to all of said actuators for normal operation of said devices and to each of a plurality of testing positions in each of which said selector connects said source with the selected one of said actuators to test the fluid pressure thereof, said selector means including furthermore, when occupying its first position, means which interconnect part of said actuators in the normal operation of said devices, said interconnections being cut off when said selector is displaced to any of said plurality of testing positions.

References Cited by the Examiner

UNITED STATES PATENTS

| | | | |
|---|---|---|---|
| 1,538,167 | 5/25 | Chappell et al. | 60—52 |
| 2,363,179 | 11/44 | Harrington et al. | 180—1 X |
| 2,456,211 | 12/48 | Nardone. | |
| 2,494,324 | 1/50 | Wright | 180—51 X |
| 2,674,092 | 4/54 | Gardiner | 180—1 X |
| 2,744,407 | 5/56 | Kruger et al. | 73—49.7 |
| 2,750,742 | 6/56 | Peterson | 180—79.2 X |
| 2,788,658 | 4/57 | Liden et al. | 73—40.5 |
| 2,885,020 | 5/59 | Herbenar | 180—79.2 |
| 2,902,104 | 9/59 | Schilling | 180—79.2 |
| 3,057,423 | 10/62 | Walker | 180—1 |

OTHER REFERENCES

"Commercial Car Journal," June 1952, pages 72, 73, 124, 126, 128.

MILTON BUCHLER, *Primary Examiner.*

PHILIP ARNOLD, A. HARRY LEVY, *Examiners.*